United States Patent [19]

Alex et al.

[11] 3,795,954

[45] Mar. 12, 1974

[54] METHOD OF MAKING A MICRO-GAP MAGNETIC RECORDING HEAD

[75] Inventors: Christos G. Alex, Waban; Sahag R. Dakesian, Sudbury; Richard D. Hautzenroeder, Framingham; Adolph J. Ivanouskas, Dorchester, all of Mass.

[73] Assignee: Honeywell Information Systems Inc., Waltham, Mass.

[22] Filed: Nov. 26, 1971

[21] Appl. No.: 202,473

[52] U.S. Cl. .............................. 29/603, 179/100.2 C
[51] Int. Cl. .............................. G11b 5/42, H01f 7/06
[58] Field of Search ................ 29/603; 179/100.2 C; 340/174.1 F; 346/74 MC

[56] References Cited

UNITED STATES PATENTS

| | | | |
|---|---|---|---|
| 3,629,519 | 12/1971 | Hanak | 29/603 X |
| 3,578,920 | 5/1971 | Okamoto | 29/603 X |
| 3,458,926 | 8/1969 | Maissel et al. | 29/603 |
| 3,687,650 | 8/1972 | Case et al. | 29/603 X |
| 2,711,945 | 6/1955 | Kornei | 179/100.2 C |

FOREIGN PATENTS OR APPLICATIONS

| | | | |
|---|---|---|---|
| 999,818 | 7/1965 | Great Britain | 179/100.2 C |

*Primary Examiner*—Charles W. Lanham
*Assistant Examiner*—Carl E. Hall
*Attorney, Agent, or Firm*—Fred Jacob; Ronald T. Reiling

[57] ABSTRACT

A novel transducing gap for a magnetic recording head and method of making the same is disclosed herein. The transducing gap is comprised of a highly heat and wear resistant glass which is bonded to thin metallic coatings that have previously been bonded to the ferrite pole tips of the magnetic recording head. The thin metallic coatings serve as barriers between the glass and the ferrite during the high temperature fabrication of the glass gap.

10 Claims, 5 Drawing Figures

INVENTORS
C. G. ALEX
S. R. DAKESIAN
R. D. HAUTZENROEDER
A. J. IVANOUSKAS
BY
ATTORNEY

METHOD OF MAKING A MICRO-GAP MAGNETIC RECORDING HEAD

BACKGROUND OF THE INVENTION

This invention relates to magnetic head structures and in particular to the magnetic gap portion of such structures. More specifically, this invention concerns a novel magnetic transducing gap and the method of making the gap.

Magnetic gap structures have been previously fabricated from a variety of materials and by a variety of methods. Chief among these has been a gap consisting of a nominal amount of glass placed between the confronting pole tip surfaces of the magnetic transducing head. The fabrication of such a glass gap has been previously accomplished in a number of different ways. One method has been to insert a glass spacer into a defined gap area and thereafter melting the spacer so as to cause the glass to adhere to the confronting pole tips. Some exemplary patents which illustrate this technique are U.S. Pat. No. 3,145,453 to Duinker et al. and U.S. Pat. No. 3,375,575 to Visser et al. In both of these exemplary patents, the pole pieces are seen to consist of sintered ferromagnetic oxide which is more commonly known as ferrite. A problem commonly encountered with the ferrite pole pieces is that a certain amount of diffusion and reaction takes place between the melted glass and the ferrite due to the high solubility of metallic oxides in molten glass. This results in a coarse undefined transducing gap wherein there is no clear line of demarcation between the end of the magnetic ferrite and the beginning of the non-magnetic glass gap. It is to be furthermore noted that this type of problem exists in the fabrication of almost any glass gap structure requiring the contact of glass at an elevated temperature with the ferrite pole tip. Another method wherein such high temperature glass contact with ferrite is seen to take place is that of U.S. Pat. No. 3,494,026 to Sugaya wherein the gap space is filled with a liquid molten glass. This results in the fabrication of a glass gap with the undesirable contact of high temperature molten glass directly with the ferrite pole tips.

In order to circumvent this high temperature contact of glass with the ferrite pole tip it has often been the practice to resort to a low temperature melting point glass. This low temperature melting point glass tends to lessen any diffusion or reaction by the glass with the pole tip surfaces. This is due to the low temperature at which the glass becomes molten. This is accomplished however at the expense of having to use a relatively softer and less heat resistant glass which is subject to a faster rate of erosion then might otherwise be obtainable by a higher melting point glass. Secondly, these lower melting point glasses also produce a relatively lower bonding strength to the pole tips. This is due to the existence of impurities which are released as gases at the low melting point temperatures which then form air pockets within the gap structure.

OBJECTS OF THE INVENTION

It is therefore an object of this invention to provide a glass transducing gap within a magnetic head which contains precisely defined lines of demarcation between the glass and the ferrite pole pieces.

It is another object of this invention to provide a precisely defined glass transducing gap which consists of a relatively high melting point glass that is comparatively high in its resistance to both heat and wear.

It is a still further object of this invention to provide a method of fabricating a precisely defined high temperature glass transducing gap.

SUMMARY OF THE INVENTION

To achieve the above mentioned objects, the present invention provides a magnetic head with a uniquely defined micro-gap consisting of a high temperature glass fabricated according to a method described herein. The tips of a pair of confronting gap forming ferrite pole pieces are first coated with a thin metallic layer of non-magnetic metal. Next, the coated pole face tips are R-F sputtered with a high temperature glass. After the glass has been deposited on each coated pole tip area, the ferrite pole pieces are next joined together by a relatively high temperature bonding process so as to form a complete transducing gap. A precisely defined glass gap results wherein there is a clear line of demarcation between the ferrite pole pieces and the glass transducing gap. This is mainly due to the thin metallic layers on the pole tips which act as barriers against any diffusion by the high temperature glass. The thickness of the glass gap is also seen to be precisely controlled by carefully controlling the amount of R-F sputtering.

BRIEF DESCRIPTION OF THE DRAWINGS

For a better understanding of the present invention, reference should be made to the accompanying drawings wherein.

DESCRIPTION OF THE PREFERRED EMBODIMENT

Figure 1:
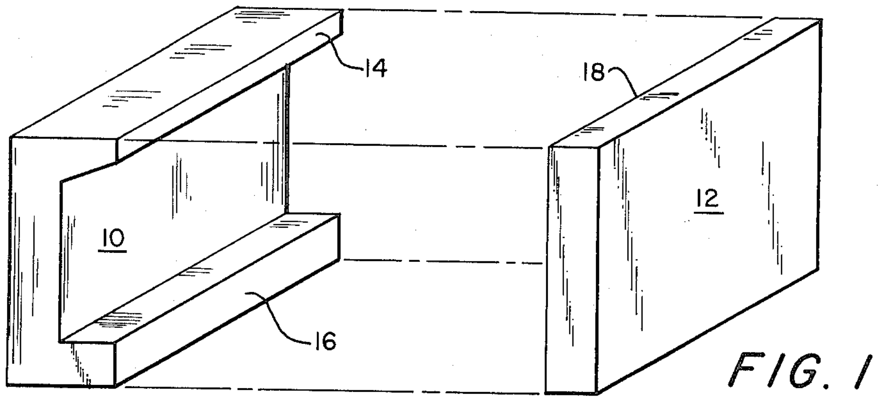
FIG. 1 is a perspective view of a pair of ferrite pieces which are to be coated and thereafter joined together to form the transducing gap structure of the present invention.

Referring now to FIG. 1, a channel shaped ferrite piece 10 is oriented toward a rectangular shaped ferrite piece 12. It is to be appreciated that the channel piece 10 and the rectangular piece 12 have been previously cut into their present configurations from whole blocks of ferrite. Following the rough cutting to an approximate geometrical shape the channel piece 10 and the rectangular piece 12 are finally lapped to the dimensions of FIG. 1 using a fine compound to prevent damage to the ferrite structure. A typical set of dimensions for the channel piece 10 is 0.260 inches in height by 0.090 inches in width by 2.0 inches in length with the channel 0.060 inches deep and each projecting edge equalling 0.030 inches in width. The corresponding dimensions for the rectangular piece 12 are 0.260 inches in height by 0.030 inches in width by 2.0 inches in length.

The channel piece 10 and the rectangular piece 12 are now to be prepared for the first coating associated with the formation of both the magnetic head and the transducing gap of this invention. The surfaces of the ferrite pieces which are to be coated are those surfaces in FIG. 1 which would normally mate together if the channel piece 10 and the rectangular piece 12 were to be joined together in their present orientations. The surfaces are to be identified as follows; a gap forming surface 14 on the channel piece 10, a rear mating surface 16 on channel piece 10, and a common mating surface 18 on the rectangular piece 12. These surfaces are to be polished preferably to a flatness within one band of helium light so as to be free of any scratches or pull outs. The surfaces 14, 16 and 18 must next be cleaned so as to remove practically all contaminants. Any particulate contamination will adversely affect the final gap structure and any chemical or absorbed gaseous contamination will degrade the bond strength of the final gap. Best result are obtained by an ultrasonic cleaning of the surfaces 14, 16 and 18 in a volatile solvent followed by a vapor cycle rinse.

Figure 2:
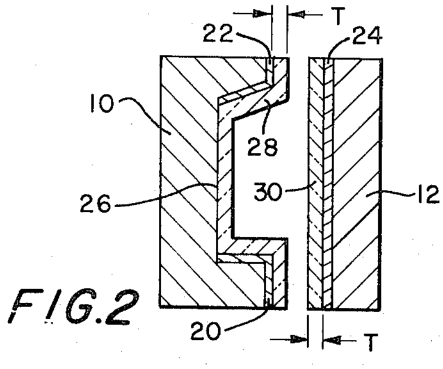
FIG. 2 is a side elevational view in section of the ferrite pieces of FIG. 1 after the various coating steps have been performed but prior to joining the coated ferrite pieces together.

The surfaces 14, 16 and 18 are now ready for the next step which consists of applying a thin coating of non-magnetic metal to the polished and chemically cleaned surfaces. The thin coating is to be preferably applied by R-F sputtering the non-magnetic metal onto the surfaces 14 through 18 in a neutral plasma environment. The non-magnetic metals which have been thus far used with particular success include chromium, nickel, and the stainless steels 301, 302, and 316. It is to be noted that the amount of R-F sputtering should only be to the extent needed to create a coating thickness which is less than or equal to 1000 angstroms. This microscopic thickness is schematically shown as thin metallic layers 20, 22, and 24 on the respective surfaces 14 through 18 in FIG. 2. It is to be noted that the recess area 26 within the channel piece 10 is not coated with a thin metallic coating. This is done as a precautionary measure so as to prevent the formation of any sort of a conductive loop around the inside of the ferrite pieces when they are finally assembled. Glass is next applied to the exposed surfaces of the channel piece 10 and the rectangular piece 12 by R-F sputtering a particularly chosen high temperature glass in a neutral plasma environment in an amount sufficient to completely cover the thin metallic layers. This usually means coating to a thickness not greater than 3000 angstroms. Glass is next sputtered in an oxygen rich plasma environment to a total glass thickness T equal to one-half of the ultimately desired transducing gap thickness. The dimension, T, can be as low as 2,000 angstroms or as high as 40,000 angstroms. The lower limit which is achievable by this process allows for an eventual overall glass gap thickness of 2T equal to 4,000 angstroms. A set of glass layers 28, and 30 of thickness T are shown in FIG. 2. It has been found that in switching to the oxygen rich plasma environment, that the resulting sputtered glass is of a higher structural homogeneity than that which is otherwise obtainable with the neutral plasma environment. This is believed to be attributable to the enhancement of a silicate chemical composition within the glass by the presence of an excessive amount of oxygen. The emphasis on such a silicate composition can be appreciated when one considers that higher percentages of silicate enhance the wear and heat resistant properties of glass.

Both of these characteristics are particularly desirable for a glass gap which is to be subjected to both wear and extreme thermal transistions.

It is for the same reasons and considerations, that glasses of relatively high silica content are preferably chosen as the glass gap material for the present invention. These glasses in general have a high softening point since they contain lesser amounts of the soft metals than do the lower softening point glasses. These high softening point temperature glasses can be best characterized as those glasses with a softening point above 700° C. The softening point has been defined on page 13 of the Corning Glass Works Publication B-83 Rev. as "the temperature at which a uniform fiber 0.55 to 0.75 mm. in diameter and 23.5 cm in length, elongates under its own weight at a rate of 1 mm. per min. when the upper 10 cm. of its length is heated in the manner prescribed in the Tentative Method of Test for Softening Point of Glass (A.S.T.M. Designation: C.338) at a rate of approximately 5° C per min." It is to be emphasized that the preferred glasses of this invention must also be appreciably wear resistant. This mechanical property is also to be found in the higher temperature glasses. For example, a glass which has been found to be both particularly wear and thermal resistant is Corning Code 7056 which is a boron silicate glass possessing a softening point temperature of 718° C.

It is to be appreciated that the glass layers 28 and 30 can be formed in manners other than the particularly disclosed R-F sputtering process. Various other methods which might be used in forming the glass layers 28 and 30 could include but are not necessarily limited to: (1) the fusing of a glass spacer directly to the thin metallic layers 20 through 24 or (2) interjecting a certain amount of molten glass adjacent the respective thin metallic layers 20 through 24 to thus form the gap. It is to be emphasized that the glass may be deposited without regard to damaging the ferrite pole tips themselves since they are first coated with the thin metallic layers.

Figure 3:
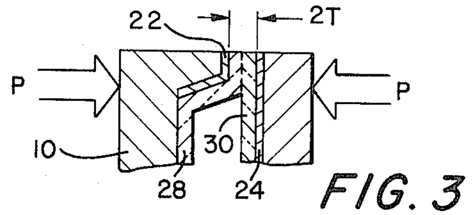
FIG. 3 is a side elevational view of the resulting glass gap structure after the ferrite pieces have been joined together.

Turning now to FIG. 3, the glass layer 28 of the channel piece 10, is brought together with the glass layer 30 of the rectangular piece 12 under contact pressure P sufficient enough to prevent any shifting of the pieces with respect to each other. The assembled pieces of FIG. 3 are next heated to a bonding temperature which is 10 percent above the softening point temperature of the glass material used in the respective layers. In the case of Corning Code Number 7056, this means a temperature of approximately 790° C which is approximately 10 percent above its softening point temperature of 718° C. The assembly in FIG. 3 is held at the bonding temperature for approximately one-half hour to insure that an actual bonding has occurred between the opposing glass layers. It is to be noted that the assembly may be held at such an elevated temperature without regard to the possible diffusion or reaction of the glass with the ferrite pieces 10 and 12 due to the barrier effect provided by the thin metallic layers 20-24.

The assembly is next cooled at a rate of 6° C per minute until the strain point of the glass is passed. The strain point of glass is defined on page 13 of the Corning Glass Works Publication B-83 Rev. as "the temperature at the lower end of the annealing range at which the internal stress is relieved in 4 hours." For Corning Code 7056, this temperature is 470° C. Below the strain point, the cooling rate may be as high as 30° C per minute without damage to the assembly.

Figure 4:
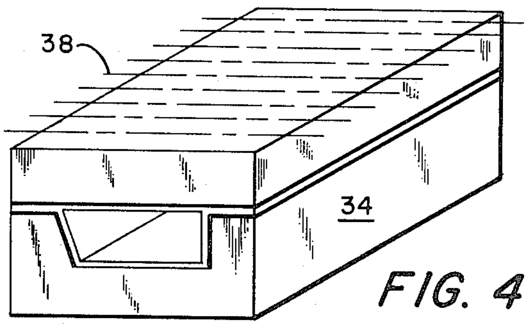
FIG. 4 is a perspective view of the assembled ferrite pieces of FIG. 1.
Figure 5:
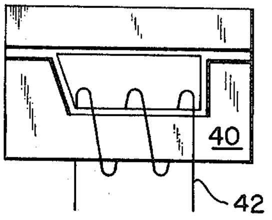
FIG. 5 is an illustration of a resulting magnetic head sliced from the assembled ferrite structure of FIG. 4.

The assembly of FIG. 3 is next lapped and polished so as to result in a composite assembly 34 as shown in FIG. 4. The composite assembly 34 is next examined for surface flaws and proper bonding in the transducing gap area. Upon proper verification of bonding, the polished assembly 34 is sliced into individual cores as indicated by dotted lines 38 according to standard industry practice of slicing and lapping. A resulting ferrite head configuration 40 is shown in FIG. 5. The ferrite head 40 also includes a hand wound coil 42 consisting of a number of bifilar turns of number 44 wire. The ferrite head 40 can be placed in a support pad conventional to high speed magnetic recording devices and the support pad can be lapped and polished to provide a conventional recording surface for high speed recording devices.

A precisely defined magnetic recording gap is thus seen to be achieved by the present invention. The use of a diffusion barrier layer consisting of a thin metallic coating between the ferrite pole pieces and the glass gap prevents the glasses which are highly heat and wear resistant from otherwise diffusing or reacting with the ferrite itself when these glasses are heated to their relatively high softening point temperature during fabrication. The further use of R-F sputtering techniques to deposit the glass allows for a precisely defined and easily controllable gap dimension. The resulting micro-gap structure is therefore seen to be extremely small and well defined as well as being both highly heat and wear resistant.

It is to be understood that the use of a thin non-magnetic metallic coating to establish a diffusion barrier to molten glass is not limited to the disclosed method of forming the glass portion of the transducing gap. For example, the previously discussed and well known method of bonding a glass spacer directly to a pair of gap-forming ferrite surfaces can include the step of first coating the gap-forming surfaces with a thin coating of non-magnetic metal according to the present invention.

What is claimed is:

1. A method of constructing a glass transducing gap of a given thickness for a magnetic head primarily composed of ferrite wherein the glass does not contact the ferrite, said method comprising the steps of:

forming a first ferrite member to produce a first gap forming surface;

forming a second ferrite member to produce a second gap forming surface;

coating the first and second gap forming surfaces with a non-magnetic metallic material so as to create a thin metallic coating on each of said gap forming surfaces;

depositing a layer of glass on each of the metallic coated gap forming surfaces, terminating said glass depositing step when the thickness of deposited glass on each of the metallic coated gap forming surfaces totals approximately one half of the thickness of the ultimately desired transducing gap;

assembling the first and second ferrite members so as to provide a slightly pressurized contact between the glass layers;

heating the contacting glass layers to a temperature above the softening point temperature of the glass consistency of the glass layers so as to thereby form a fused glass gap; and cooling the fused gap to room temperature.

2. The method of claim 1 wherein said step of coating the first and second gap forming surfaces comprises the steps of:

polishing the gap forming surfaces to an optical flatness of one bandwidth of helium light; and R-F sputtering a non-magnetic metal unto the polished gap forming surfaces to a thickness of 100 angstroms or less.

3. The method of claim 1 wherein said step of depositing glass on the metallic coated gap forming surfaces comprises the steps of:

R-F sputtering a thin layer of glass unto the metallic coated gap forming surfaces in a neutral plasma environment;

limiting the R-F sputtering of glass in the neutral plasma environment to a thickness less than or equal to 3,000 angstroms; and R-F sputtering a layer of glass unto the previously created thin layer of glass in an oxygen rich plasma environment to a combined glass thickness equal to approximately one-half the desired gap thickness.

4. The method of claim 3 wherein the step of heating the contacting glass layers comprises the steps of:

heating the contacting glass layers to a maximum temperature of 10 percent above the softening point temperature of the glass layers; and maintaining the contacting glass layers at or above the softening point temperature for a period of one-half hour.

5. The method of claim 4 wherein said cooling step comprises the steps of:

cooling the fused glass at a cooling rate less than or equal to 6° C per minute until the strain point of the glass is reached; and thereafter cooling the fused glass to ambient temperature at a rate less than or equal to 30° C per minute.

6. The method of claim 5 wherein said step of coating the first and second gap forming surfaces comprises the steps of:

polishing the gap forming surfaces to an optical flatness of one bandwidth of helium light; and R-F sputtering a non-magnetic metallic coating to a thickness of 1000 angstroms unto the polished gap forming surfaces.

7. A method of forming a gap in a magnetic head assembly comprising the steps of: providing a pair of confronting ferrite pole tip surfaces spaced apart a given distance so as to define a gap between the pole tip surfaces;

coating each ferrite pole tip surface with a non-magnetic metal to a thickness less than or equal to a defined maximum coating thickness so as to create a thin metallic coating on each of the pole tip surfaces; and filling the gap existing between the confronting metallic coated pole tip surfaces with an amount of glass which results in a glass thickness between the metallic coated pole surfaces which is substantially greater than twice the maximum coating thickness of the non-magnetic metal coatings.

8. The method of claim 7 wherein the glass used in said step of forming a glass gap comprises a glass with a softening point temperature greater than or equal to 700° C and wherein said step of forming a glass gap includes the step of heating the glass to a temperature in excess of its softening point temperature.

9. The method of claim 8 further comprising the step of:

limiting said step of coating the ferrite pole tip surfaces with a non-magnetical metal to a coating thickness which is less than or equal to 1000 angstroms.

10. The method of claim 9 wherein the non-magnetic metallic coating used in said step of coating the pole tip surfaces is a metal selected from the group consisting of metals consisting of nickel, chromium, and the stainless steels 301, 302 and 304.

* * * * *